United States Patent
Kaseda et al.

(10) Patent No.: US 10,661,328 B2
(45) Date of Patent: May 26, 2020

(54) PRODUCTION METHOD OF WHEEL RIM, AND PRODUCTION METHOD OF VEHICLE WHEEL RIM

(71) Applicant: NIPPON STEEL & SUMITOMO METAL CORPORATION, Tokyo (JP)

(72) Inventors: Yoshiyuki Kaseda, Kimitsu (JP); Yutaka Mikazuki, Kimitsu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 167 days.

(21) Appl. No.: 15/111,548

(22) PCT Filed: Mar. 12, 2015

(86) PCT No.: PCT/JP2015/057362
§ 371 (c)(1),
(2) Date: Jul. 14, 2016

(87) PCT Pub. No.: WO2015/137463
PCT Pub. Date: Sep. 17, 2015

(65) Prior Publication Data
US 2016/0332210 A1 Nov. 17, 2016

(30) Foreign Application Priority Data

Mar. 14, 2014 (JP) .................. 2014-051431

(51) Int. Cl.
*B21D 53/30* (2006.01)
*B21K 21/12* (2006.01)
(Continued)

(52) U.S. Cl.
CPC ............. *B21D 53/30* (2013.01); *B21J 5/08* (2013.01); *B21J 9/08* (2013.01); *B21K 1/38* (2013.01);
(Continued)

(58) Field of Classification Search
CPC .......... B21D 19/00; B21D 53/30; B21K 1/38; B21K 21/12; B60B 3/04; B60B 21/00;
(Continued)

(56) References Cited

U.S. PATENT DOCUMENTS 4,049,184 A * 9/1977 Rozengart ............. B21C 37/154
228/131
4,050,135 A * 9/1977 Luedi .................... B21D 53/30
29/894.353
(Continued)

FOREIGN PATENT DOCUMENTS

CN 200984931 Y 12/2007
CN 101468370 A 7/2009
(Continued)

OTHER PUBLICATIONS

International Search Report for PCT/JP2015/057362 dated Jun. 16, 2015.
(Continued)

*Primary Examiner* — Matthew P Travers
(74) *Attorney, Agent, or Firm* — Birch, Stewart, Kolasch & Birch, LLP

(57) ABSTRACT

A production method of a wheel rim includes: a step of forming a cylindrical rim material into a rim shape; and a step of increasing a sheet thickness of at least one opening end edge of the rim material at least one of before and after the step of forming of the cylindrical rim material. In addition, in the step of increasing of the sheet thickness, in a state in which the opening end edge is inserted into an annular groove of a die provided with the annular groove which is wider than the sheet thickness of the opening end edge, a thickened portion is formed by exerting a compressive load in an axial direction of the rim material on the opening end edge.

5 Claims, 9 Drawing Sheets

(51) Int. Cl.
*B21K 1/38* (2006.01)
*B21J 5/08* (2006.01)
*B21J 9/08* (2006.01)
*B60B 21/00* (2006.01)
*B60B 3/04* (2006.01)
*B21D 19/00* (2006.01)

(52) U.S. Cl.
CPC .............. *B21K 21/12* (2013.01); *B21D 19/00* (2013.01); *B60B 3/04* (2013.01); *B60B 21/00* (2013.01); *B60B 2310/208* (2013.01)

(58) Field of Classification Search
CPC ......... B60B 2310/208–2082; Y10T 29/49524; Y10T 29/49529; B21J 5/08; B21J 9/08
See application file for complete search history.

(56) References Cited

U.S. PATENT DOCUMENTS

| | | | | |
|---|---|---|---|---|
| 4,067,220 A | * | 1/1978 | Hoffmann | B21B 1/06 72/201 |
| 4,842,818 A | * | 6/1989 | Kato | B21C 37/04 420/100 |
| 2004/0205966 A1 | * | 10/2004 | Ohishi | B21D 19/08 29/889.2 |
| 2005/0274015 A1 | | 12/2005 | Tanaka | |
| 2006/0254338 A1 | * | 11/2006 | Otaki | B21J 5/08 72/353.2 |
| 2008/0141532 A1 | * | 6/2008 | de Souza Manso | B21H 1/10 29/894.35 |
| 2009/0189391 A1 | | 7/2009 | Ferlin et al. | |
| 2015/0165510 A1 | * | 6/2015 | Egsgaard | B21J 5/08 301/95.11 |
| 2015/0296605 A1 | * | 10/2015 | Yamaguchi | B23K 10/006 219/121.44 |

FOREIGN PATENT DOCUMENTS

| | | | | |
|---|---|---|---|---|
| DE | 2843728 A1 | | 4/1980 | |
| GB | 550186 | * | 12/1942 | ............... B21J 9/08 |
| GB | 2503936 A | | 1/2014 | |
| JP | 55-10385 A | | 1/1980 | |
| JP | 59-109404 A | | 6/1984 | |
| JP | 62-24834 A | | 2/1987 | |
| JP | 6-182471 A | | 7/1994 | |
| JP | 11-333537 A | | 12/1999 | |
| JP | 2005-349455 A | | 12/2005 | |
| WO | WO 96/25257 A1 | | 8/1996 | |
| WO | WO 2011/125968 A1 | | 10/2011 | |
| WO | WO 2014/009695 A1 | | 1/2014 | |

OTHER PUBLICATIONS

Written Opinion of the International Searching Authority for PCT/JP2015/057362 (PCT/ISA/237) dated Jun. 16, 2015.
Chinese Office Action dated Jun. 21, 2017, for Chinese Patent Application No. 201580012172.3 (English translation of only a part of Search Report).
Japanese Notice of Reasons for Rejection, dated May 30, 2017, for corresponding Japanese Application No. 2016-507831, with an English translation.
Japanese Office Action for counterpart Japanese Application No. 2017-250240, dated Oct. 2, 2018, with English translation.
Korean Notice of Allowance for counterpart Korean Application No. 10-2016-7024760, dated Sep. 13, 2018, with English translation.

* cited by examiner

PRODUCTION METHOD OF WHEEL RIM, AND PRODUCTION METHOD OF VEHICLE WHEEL RIM

TECHNICAL FIELD OF THE INVENTION

The present invention relates to a production method of a wheel rim and a production method of a vehicle wheel rim.

Priority is claimed on Japanese Patent Application No. 2014-051431, filed on Mar. 14, 2014, the content of which is incorporated herein by reference.

RELATED ART

As an example of a wheel rim, a vehicle wheel rim is shown in FIG. 12. A vehicle wheel 1 is constituted by a substantially cylindrical rim 1a, and a disc 1b fixed to the rim 1a. In the rim 1a, a rim shape including a drop 2, wells 3a and 3b, a ledge 4, bead seats 5a and 5b, flanges 6a and 6b, and the like is formed.

A production method of the rim 1a generally includes a step of correcting an uncoiled steel strip to be flat using a roller, a step of obtaining a flat sheet by cutting the corrected steel strip, a step of bending the obtained flat sheet into a cylindrical shape, a step of obtaining a cylindrical rim material by butt-welding both end edges of the bent flat sheet, a flaring step of increasing the diameters of both opening end edges of the rim material, a plurality of rolling steps of forming the rim material into the rim shape, and an expanding step of adjusting the rim diameter.

The rim 1a of the vehicle wheel 1 is required to be lightweight and have sufficient strength. The degree of stress generated in the rim 1a varies depending on the region and use situations. For example, when a vehicle steadily travels, stress in the drop 2 increases, and when the vehicle collides with a curbstone, stress in the flange 6a or 6b increases. However, in the rim 1a, there is a region which does not receive high stress and does not require high strength regardless of the travelling state of the vehicle. Such a region may be reduced in thickness as long as a certain degree of strength is ensured. As a result, it is possible to achieve a reduction in the weight of the rim 1a. On the other hand, during collision with the curbstone, high stress is exerted on the opening end edge (the flange 6a or 6b) of the rim 1a which particularly faces the outside, and it is effective for increasing the thickness of such a region to be strengthened.

However, the opening end edge of the rim 1a has a longer circumference than those of the drop 2 and the like and is likely to be thinned in the rolling steps. Therefore, for example, in Patent Document 1, in order to produce a rim, a sheet material having different sheet thicknesses in a transverse direction is produced in advance, and the sheet thickness of a region corresponding to the opening end edge of the rim (a region called an "edge portion" in Patent Document 1) is formed to be greater than that of a region corresponding to the other region (a region called a "bottom portion" in Patent Document 1).

Patent Document 2 discloses an invention related to "a forming method of a vehicle wheel, which is performed by nipping a disk-shaped forming material between an end surface of a mandrel having a spinning forming die on its outer circumference and a tailstock that opposes the end surface, the method including a spinning step of pressing the forming material against the forming die using a spinning roller moved along the forming die, and a thickening step of moving a thickening roller, which has a circumferential wall portion that opposes the forming die and a side wall portion that extends in a direction substantially perpendicular to a rotating shaft of the mandrel, toward the inside in a radial direction of the mandrel, thereby deforming a circumferential edge portion of the forming material so as to be thickened and forming an outer edge flange portion of a wheel rim between an inner end surface that rises toward the outside in the radial direction from an inner end portion of the forming die to the inner end portion and a circumferential wall portion to a side wall portion of the thickening roller".

CITATION LIST

Patent Document

[Patent Document 1] Japanese Unexamined Patent Application, First Publication No. S59-109404
[Patent Document 2] Japanese Unexamined Patent Application, First Publication No. H6-182471

DISCLOSURE OF THE INVENTION

Problems to be Solved by the Invention

In the production method described in Patent Document 1, since the step of producing the sheet material having different sheet thicknesses in the transverse direction in advance is needed, there is a problem of an increase in production costs. In addition, there is a need to change a groove shape of a roller according to a cross-sectional shape of the rim, and it is difficult to easily change the cross-sectional shape in consideration of time and effort. Furthermore, in a case of using the sheet material having different sheet thicknesses in the transverse direction, it is difficult to perform control of bending of the sheet material to obtain a cylindrical rim material with good accuracy. Therefore, obtaining a cylindrical rim material with high dimensional accuracy requires a complex production step.

On the other hand, as in the production method described in Patent Document 2, in the method of thickening an opening end edge by moving the thickening roller in a radial direction of a cylindrical rim material, successive processing in which the rim material disposed on an outer circumferential surface of the mandrel is repeatedly locally deformed by the thickening roller is mainly performed. During the thickening in this method, there is a need to use a spinning machine, resulting in low production efficiency and an increase in production costs. Particularly in a case where the spinning machine is provided in advance as in a production step of an aluminum wheel or the like, it is relatively easy to employ this method. However, in a case of a rim produced basically by a rolling step as in a production step of a steel wheel rim, an increase in costs for the addition of the spinning machine is incurred.

The present invention has been made taking the foregoing circumstances into consideration, and an object thereof is to provide a production method of a wheel rim and a production method of a vehicle wheel rim capable of thickening of an opening end edge of a wheel rim with no reduction in production efficiency, and good dimensional accuracy.

Means for Solving the Problem

In order to accomplish the object, the inventors conducted intensive research on a method of producing a cylindrical rim material and thereafter thickening an opening end edge of the rim material without buckling and completed the present invention.

That is, the gist of each of aspects of the present invention is as follows.

(1) According to an aspect of the present invention, a production method of a wheel rim includes: a step of forming a cylindrical rim material into a rim shape; and a step of increasing a sheet thickness of at least one opening end edge of the rim material at least one of before and after the step of forming of the cylindrical rim material, in which, in the step of increasing of the sheet thickness, in a state in which the opening end edge is inserted into an annular groove of a die provided with the annular groove which is wider than the sheet thickness of the opening end edge, a thickened portion is formed by exerting a compressive load in an axial direction of the rim material on the opening end edge.

(2) In the production method of a wheel rim described in (1), the step of increasing of the sheet thickness may include heating the opening end edge.

(3) In the production method of a wheel rim described in (2), after the heating of the opening end edge, the opening end edge may be inserted into the annular groove to receive the compressive load.

(4) In the production method of a wheel rim described in (2), the compressive load may be exerted on the opening end edge while the opening end edge is heated in a state of being inserted into the annular groove.

(5) In the production method of a wheel rim described in any one of (2) to (4), in a case where a width of a heated region of the opening end edge in the axial direction before the compressive load is exerted is referred to as Wh and the width of the thickened portion after the compressive load is exerted is referred to as W, Wh>W may be satisfied.

(6) In the production method of a wheel rim described in any one of (2) to (5), in a case where a depth of the annular groove in the axial direction is referred to as D and the width of the heated region of the opening end edge before the compressive load is exerted is referred to as Wh, D>Wh may be satisfied.

(7) In the production method of a wheel rim described in any one of (2) to (6), a heating temperature of the opening end edge may be within a range of 450° C. to 850° C.

(8) In the production method of a wheel rim described in any one of (1) to (7), in the step of increasing of the sheet thickness, the compressive load may be exerted while an inner circumferential surface of the opening end edge is supported by an inner wall of the annular groove during the increasing of the sheet thickness and an outer circumferential surface of the opening end edge is supported by an outer wall of the annular groove which is wider than the inner wall.

(9) A production method of a vehicle wheel of the present invention includes: a step of fixing a disc into the wheel rim obtained in the production method of a wheel rim described in any one of (1) to (8).

(10) In the production method of a vehicle wheel described in (9), in the step of increasing of the sheet thickness, the thickened portion may be formed in at least the opening end edge of both the opening end edges of the rim material, which faces the outside when mounted in a vehicle.

Effects of the Invention

According to the production method of a wheel rim described in (1) of the present invention, the opening end edge of the wheel rim such as a vehicle wheel rim can be thickened with no reduction in production efficiency, and good dimensional accuracy. Therefore, even when the rim material is thinned due to a reduction in the weight of the wheel rim, sufficient strength can be obtained by thickening the opening end edge.

In addition, in a case of the production method of a wheel rim described in (2) to (7), since the opening end edge can be locally softened through heating, it becomes possible to more stably perform the thickening without the occurrence buckling.

In addition, in a case of the production method of a wheel rim described in (8), it becomes possible to perform the thickening while more reliably preventing the occurrence of buckling of the opening end edge.

In addition, in a case of the production method of a vehicle wheel rim described in (9) and (10), it becomes possible to obtain the same effects as those of the production method of a wheel rim described in (1).

EMBODIMENTS OF THE INVENTION

As an example of a production method of a wheel rim according to the present invention, each embodiment regarding a method of producing a vehicle wheel rim will be described. However, the production method of the present invention can also be applied to production of various types of wheel rims in addition to the vehicle wheel rim.

Figure 1:
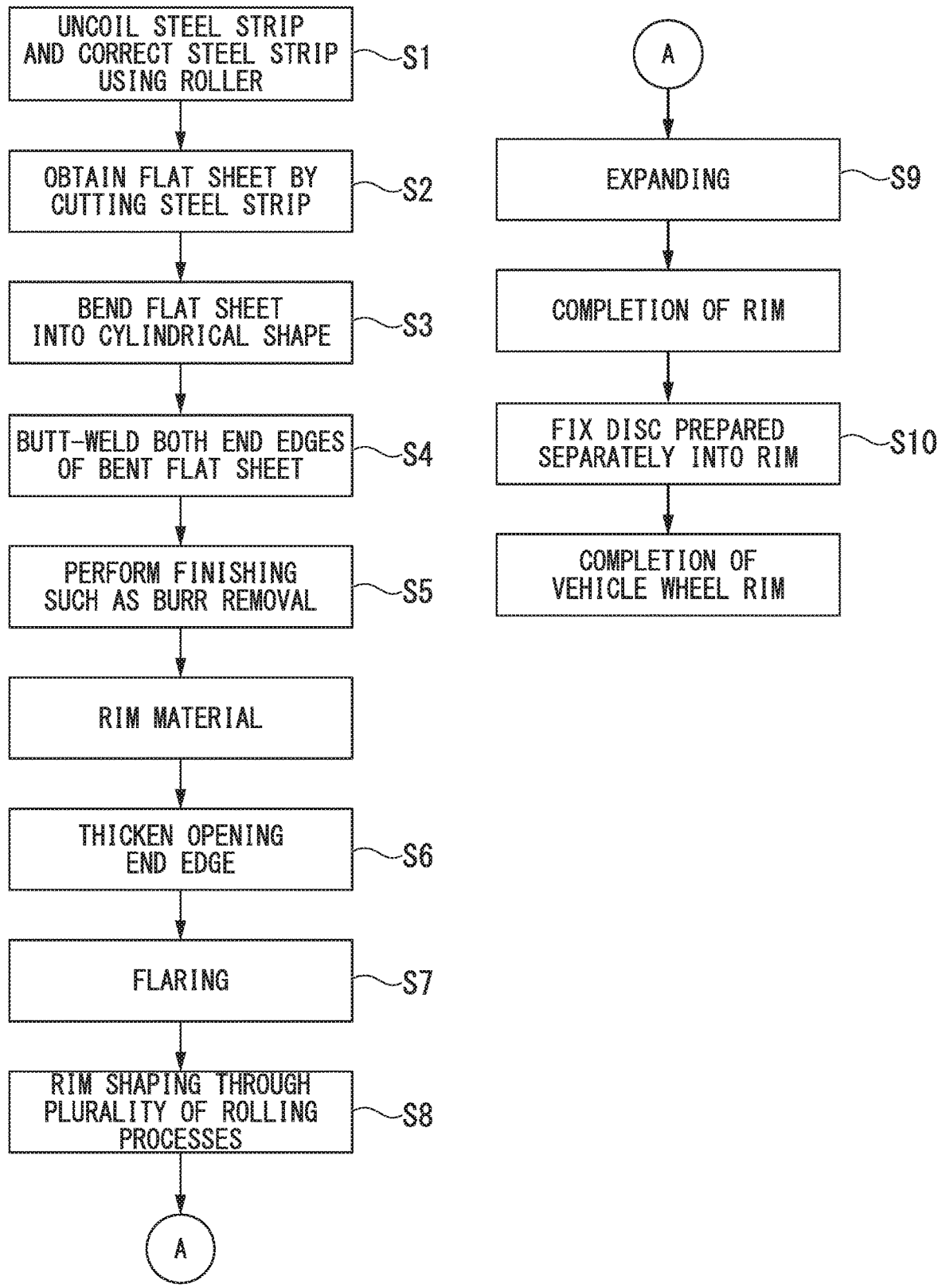
FIG. 1 is a view showing a first embodiment of the present invention and is a flowchart showing a production method of a vehicle wheel rim.

When a vehicle wheel rim is produced, first, there is a need to obtain a cylindrical rim material from a flat sheet, and as the method, a general method may be employed. For example, as shown in the flowchart of FIG. 1, the cylindrical rim material may be obtained by a step S1 of uncoiling a steel strip that is wound in a coil shape and correcting the steel strip using a roller, a step S2 of obtaining a flat sheet by cutting the corrected steel strip into predetermined dimensions, a bending step S3 of bending the obtained flat sheet into a cylindrical shape, a butt-welding step S4 of butt-welding both end edges of the bent flat sheet, and a finishing step S5 of removing burr of the weld.

Each embodiment of a method of producing a vehicle wheel rim from the rim material obtained as described above will be subsequently described below.

First Embodiment

In a production method of a vehicle wheel rim according to a first embodiment of the present invention, the cylindrical rim material is subjected to a thickening step S6 of thickening at least one of a pair of opening end edges (hereinafter, sometimes referred to as "circumferential edge portions", which are a pair of annular portions denoted by reference numeral 21 in FIG. 2) thereof, a flaring step S7 of increasing the diameters of both the opening end edges of the rim material, a plurality of rolling steps S8 of forming the rim material into a rim shape, and an expanding step S9 of adjusting the rim diameter. As a result, a rim is completed.

Figure 12:
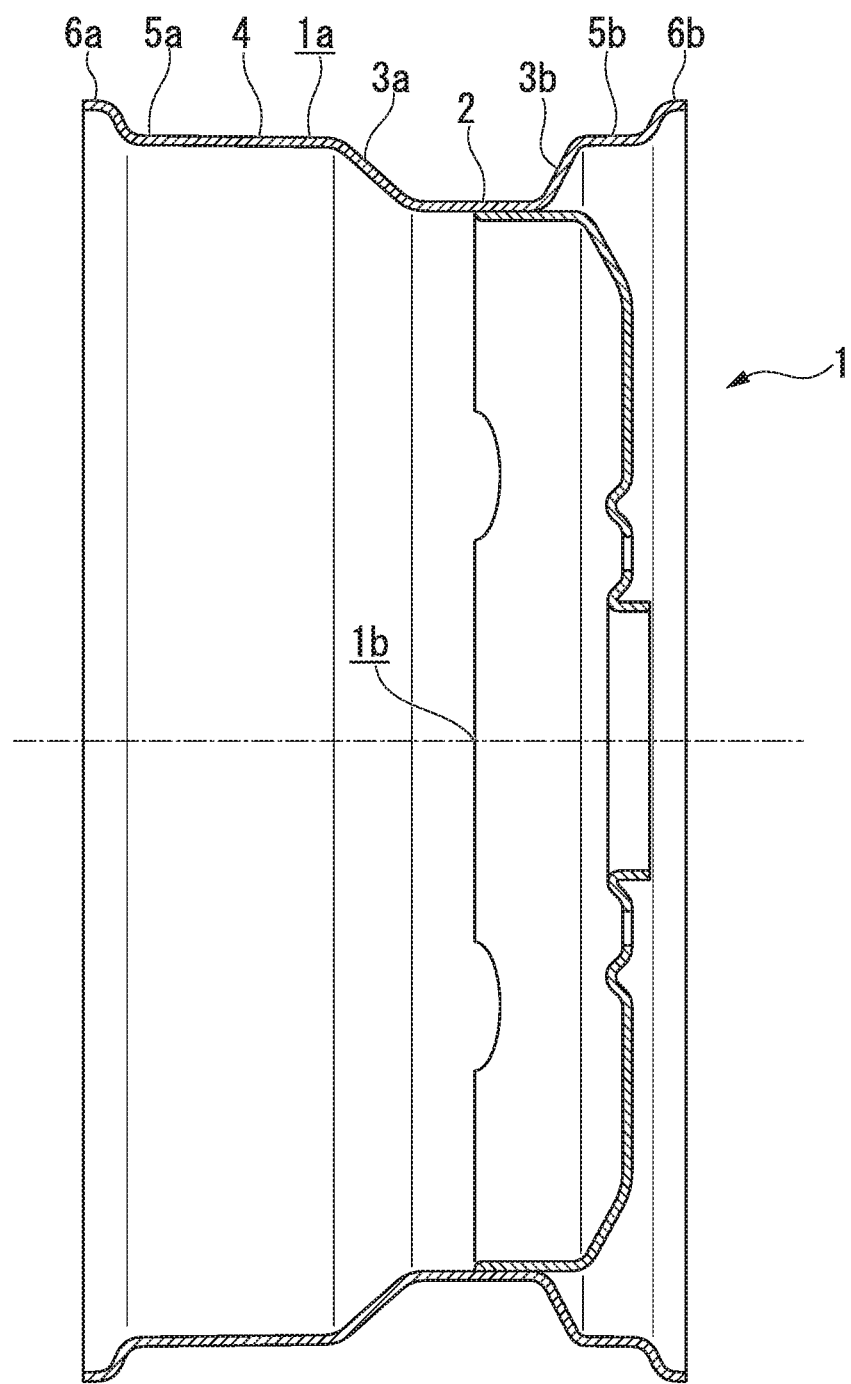
FIG. 12 is a view showing an example of a wheel structure and is a vehicle wheel in a case of being viewed in a section including an axis.

As an example of the rim shape, as in the rim 1a described with reference to FIG. 12, a shape including the drop 2, the wells 3a and 3b, the ledge 4, the bead seats 5a and 5b, the flanges 6a and 6b, and the like may be employed.

Specific contents of the flaring step S7 and the rolling steps S8 are not particularly limited, and a general method may be employed. The flaring step S7 is a step of increasing the diameters of the circumferential edge portions of the rim material by pressing the circumferential edge portions of the cylindrical rim material using a forming tool. In addition, in the rolling steps S8, the cylindrical rim material that is flared is rolled while being nipped between a pair of rolls with predetermined concave and convex portions formed therein, thereby being formed into the rim shape. The rolling steps S8 include, for example, a drop forming step, a flange forming step, and a finish forming step.

Figure 2:
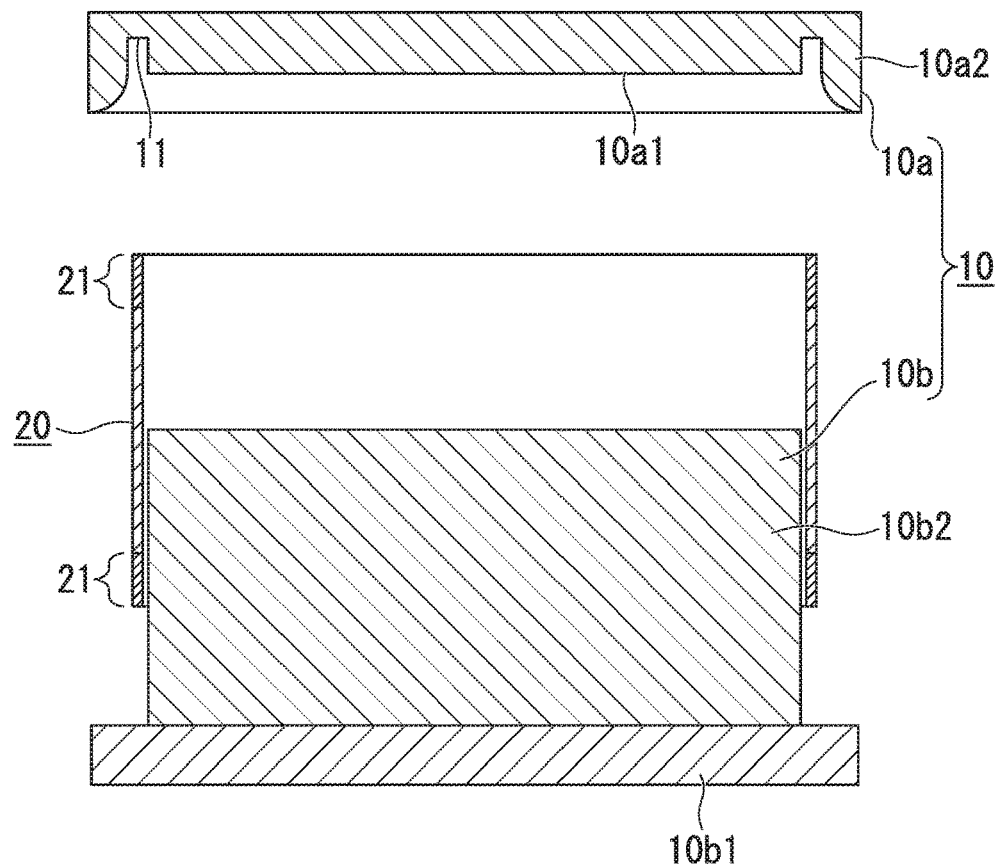
FIG. 2 is a view showing the embodiment and is a sectional view before a thickening step.
Figure 3:
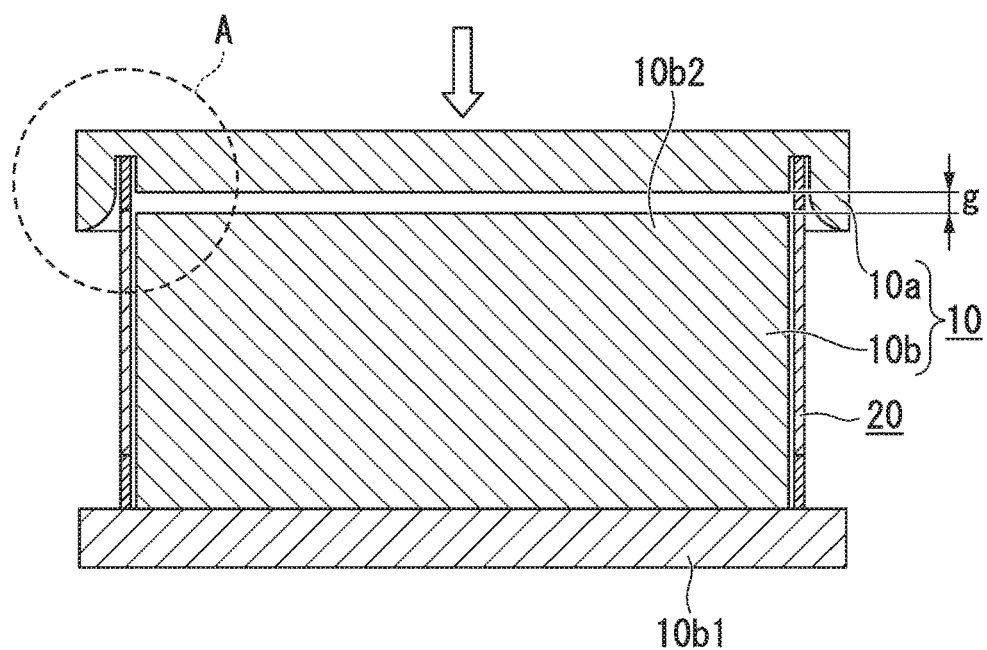
FIG. 3 is a view showing the embodiment and is a sectional view during the thickening step.

The thickening step S6 includes: a heating step of forming, in the circumferential edge portion 21 of a rim material 20, a heated region 22 which is heated in advance to have reduced deformation resistance; and a pressing step of thickening the heated region 22 by performing pressing, for example, using a die 10 (10a and 10b) shown in FIGS. 2 and 3 after the heating step.

The heating step is performed as a pre-treatment of the pressing step. However, the pressing step which is the base of the thickening step S6 will be described first, and thereafter the heating step will be subsequently described.

As shown in FIG. 2, the die 10 is constituted by a pressing die 10a having an annular groove 11 and a supporting die 10b which supports the inner circumferential surface of the rim material 20, the dies forming a pair.

The pressing die 10a is a disk-shaped die having a greater outer diameter than that of the rim material 20, and includes an inner circular convex portion 10a1 which is formed on the inside with respect to the annular groove 11 as the boundary, and an outer circular convex portion 10a2 which is formed on the outside of the annular groove 11. In other words, the annular groove 11 is defined by the outer circumferential surface of the inner circular convex portion 10a1, the inner circumferential surface of the outer circular convex portion 10a2, and a bottom surface formed on the inside of the outer circumferential surface and the inner circumferential surface which face each other.

The annular groove 11 is coaxial with the center of the pressing die 10a and has the same groove width and groove depth at any position in the circumferential direction thereof.

The outer circular convex portion 10a2 has a greater height from the bottom surface of the annular groove 11 than that of the inner circular convex portion 10a1. In addition, in the outer circular convex portion 10a2, a chamfer having an arc shape in a sectional view is formed to be smoothly connected to the inner circumferential surface of the annular groove 11. Since the chamfer is formed, the rim material 20 can be smoothly guided and inserted into the annular groove 11.

The supporting die 10b includes a base portion 10b1 having a disk shape, and a columnar portion 10b2 which is formed on the base portion 10b1 to be integrated therewith on the same axis as that of the base portion 10b1. In order to support the inner circumferential surface of the rim material 20 on the inside, the outer diameter of the columnar portion 10b2 is determined to be close to the inner diameter of the inner circumferential surface of the rim material 20 and to ensure a clearance necessary for fitting of the rim material 20 on the outside.

In addition, the height of the columnar portion 10b2 is smaller than the axial height of the rim material 20. This is because the thickening of the rim material 20 is to be performed. Details will be described later.

During the thickening step S6, in the pressing step after the heating step, first, as shown in FIGS. 2 and 3, in a state in which the rim material 20 is held by the supporting die 10b, the pressing die 10a is put thereon. At this time, the pressing die 10a is put so as to allow one circumferential edge portion 21 of the rim material 20 to be accommodated in the annular groove 11.

More specifically, first, as shown in FIG. 2, the rim material 20 is externally fitted to the columnar portion 10b2 of the supporting die 10b on the same axis. As a result, as shown in FIG. 3, the other circumferential edge portion 21 which is the lower end of the rim material 20 abuts the upper surface of the base portion 10b1 such that the rim material 20 is disposed to achieve a state in which an axial load on the rim material 20 is supported by the upper surface of the base portion 10b1 and the circumferential edge portion 21 extends upward from the upper surface of the columnar portion 10b2 by predetermined dimensions.

Subsequently, the pressing die 10a is lowered from the upper side of the rim material 20 while allowing the circumferential edge portion 21 of the rim material 20 and the annular groove 11 to be coaxial with each other, and the circumferential edge portion 21 is coaxially accommodated in the annular groove 11. In addition, when the circumferential edge portion 21 of the rim material 20 reaches the bottom surface of the annular groove 11, the state shown in FIG. 3 is achieved. In this state, the columnar portion 10b2, the rim material 20, and the annular groove 11 are coaxial with each other. Moreover, a predetermined gap g is provided between the lower surface of the inner circular convex portion 10a1 of the pressing die 10a and the upper surface of the columnar portion 10b2 of the supporting die 10b. The gap g acts as a compression margin.

The pressing die 10a is further lowered toward the rim material 20 from the state of FIG. 3 in which the circumferential edge portion 21 of the rim material 20 is accommodated in the annular groove 11 as described above, and a compressive load is exerted in the axial direction (a direction indicated by the white arrow in FIG. 3) on the circumferential edge portion 21 of the rim material 20 and particularly the heated region 22 in the circumferential edge portion 21 is thickened and deformed so as to fill the annular groove 11. At a point of time when the gap g becomes zero, compression is ended.

Thereafter, when the pressing die 10a is detached from the rim material 20 and the rim material 20 is further detached from the supporting die 10b, only the circumferential edge portion 21 of the rim material 20 has a greater sheet thickness than those of other portions, and the thickening step S6 is completed.

The flaring step S7, the rolling steps S8, and the expanding step S9 are performed on the rim material 20 after the thickening step S6. By welding and fixing (a step S10 in FIG. 1) the disc to the rim processed as described above, a vehicle wheel rim is completed.

In addition, the supporting die 10b is a die having a main function of preventing bending of the rim material 20. Therefore, there may be no gap between the inner circumferential surface of the rim material 20 and the outer circumferential surface of the columnar portion 10b2. However, when the gap is too narrow, it becomes difficult to attach and detach the rim material 20. Therefore, a certain degree of gap is preferably present. For example, the difference in dimensions between the inner diameter of the rim material 20 and the outer diameter of the columnar portion 10b2 may be set to 1.0 mm to 3.0 mm. In this case, the gap is substantially the half of the difference in dimensions and this becomes 0.5 mm to 1.5 mm.

In addition, in this embodiment, the supporting die 10b which supports the inner circumferential surface of the rim material 20 with the outer circumferential surface of the columnar portion 10b2 is described. However, the embodiment is not limited to this configuration. For example, a supporting die (not shown) which covers the outer circumferential surface of the rim material 20 to cover the outer circumferential surface, or a supporting die (not shown) which supports both the inner circumferential surface and the outer circumferential surface of the rim material 20 may also be employed.

The thickening S6 in this embodiment is performed on one of the pair of circumferential edge portions 21 in the cylindrical rim material 20 and may also be performed on both thereof. In addition, in a case where the thickening step S6 is performed only one of the pair of circumferential edge portions 21, the thickening step S6 is preferably performed on the circumferential edge portion that faces the outside when the vehicle wheel rim is mounted in a vehicle.

Furthermore, in this embodiment, the thickening step S6 is performed before the rim shaping (before the rolling steps S8). However, the embodiment is not limited thereto, and the rim shaping may be performed first and the thickening step S6 may be performed thereafter. Otherwise, the thickening step S6 may be performed in two stages and each stage may be performed before and after the rim shaping.

The gist of the production method of the vehicle wheel rim according to this embodiment described above is summarized as follows.

The production method of the vehicle wheel rim according to this embodiment includes: a forming step (the rolling steps S8) of forming the cylindrical rim material 20 into the rim shape; and the thickening step S6 of increasing the sheet thickness of at least one of the circumferential edge portions 21 of the rim material 20 at least one of before and after the forming step. In addition, in the thickening step S6, in a state in which the circumferential edge portion 21 which is provided with the heated region 22 in advance is inserted into the annular groove 11 of the pressing die 10a having the annular groove 11 which has a width greater than the sheet thickness of the circumferential edge portion 21, a compressive load in the axial direction of the rim material 20 is exerted on the circumferential edge portion 21, thereby forming a thickened portion.

According to this embodiment described above, the thickening is performed by compression using the die 10. Therefore, compared to thickening using a spinning machine, the circumferential edge portion 21 of the rim material 20 can be thickened within a shorter period of time. Therefore, the processing can be performed within cycle times of the steps S1 to S5, and the steps S7 to S9 before and after the thickening step S6, and thus production efficiency is not reduced. That is, in a case where a plurality of rim materials 20 are processed in each of the steps S1 to S9 shown in FIG. 1 while being sequentially transported, the number of products produced per unit time, that is, production efficiency is determined by the step (for example, the rolling steps S8) that requires the longest operation time among the steps S1 to S9. In a case where the thickening step S6 is considered from this viewpoint, the thickening step S6 can be ended within a shorter period of time than that of the rolling steps S8. Therefore, the production efficiency is not reduced.

In addition, since an expensive apparatus such as a spinning machine is not used but the relatively simple pressing device is used, a small increase in production cost is required for the thickening.

Although the pressing step which is the base of the thickening step S6 has been described, in order to selectively thicken only the circumferential edge portion 21 during the pressing step of the rim material 20, the deformation resistance of the circumferential edge portion 21 needs to be reduced in advance. A pre-treatment for this is the heating step. Details thereof will be described in association with the contents of the pressing step.

Figure 4A:
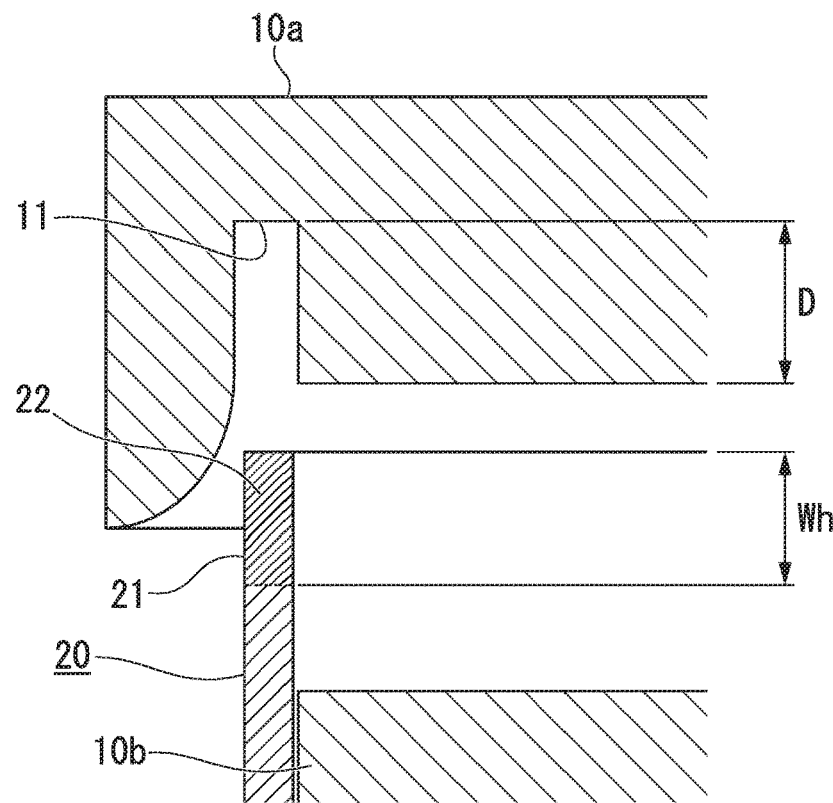
FIG. 4A is a view showing the embodiment and is a partial sectional view corresponding to the section A of FIG. 3 before the thickening step.
Figure 4B:
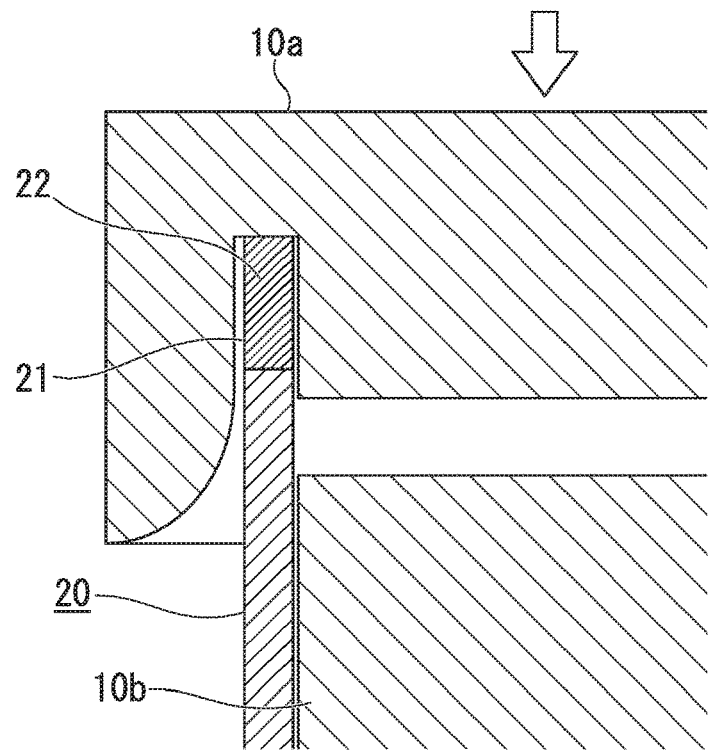
FIG. 4B is a view showing an intermediate stage of the thickening step in the embodiment and is a partial sectional view corresponding to the section A of FIG. 3.
Figure 4C:
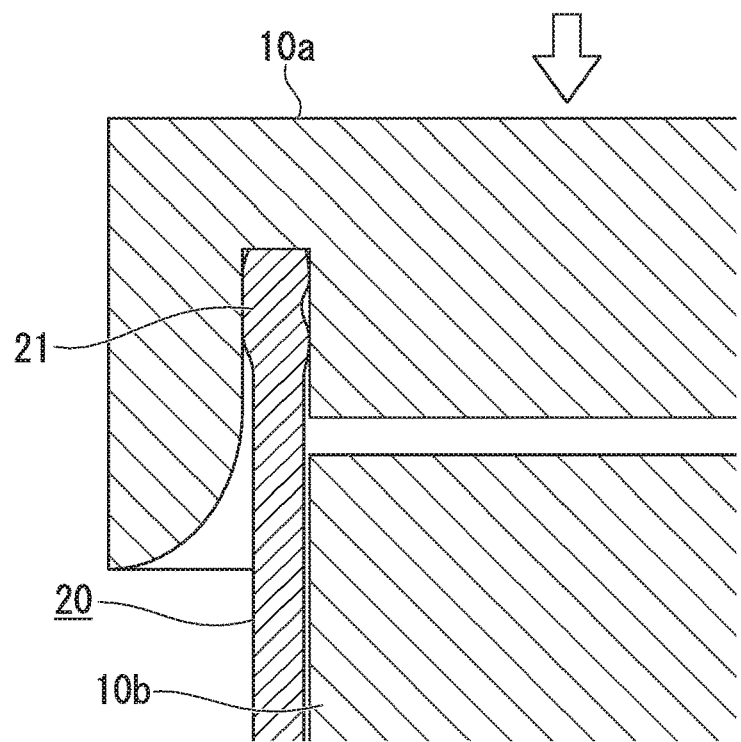
FIG. 4C is a view showing an intermediate stage of the thickening step in the embodiment and is a partial sectional view corresponding to the section A of FIG. 3.
Figure 4D:
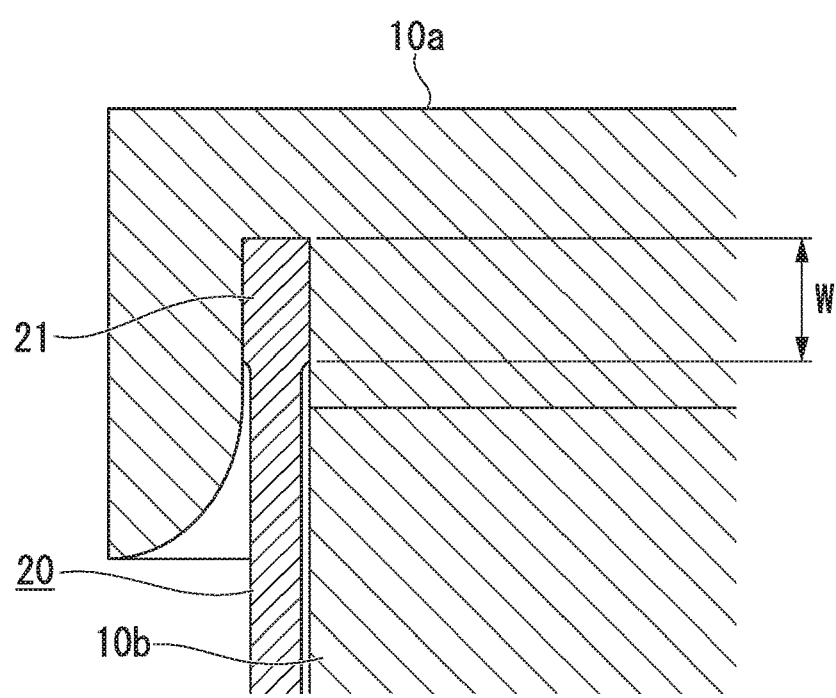
FIG. 4D is a view showing an intermediate stage of the thickening step in the embodiment and is a partial sectional view corresponding to the section A of FIG. 3.

That is, in the production method of the vehicle wheel rim according to this embodiment, when the thickening step S6 is performed, as shown in FIG. 4A, the heated region 22 which is heated in advance to have reduced deformation resistance is formed in the circumferential edge portion 21 of the rim material 20. Thereafter, as shown in FIG. 4B, the circumferential edge portion 21 including the heated region 22 is accommodated in the annular groove 11, and a compressive load is exerted in the axial direction (the direction indicated by the white arrow) of the rim material 20 is in this state. Therefore, as shown in FIGS. 4C and 4D, it becomes easier to selectively thicken only the circumferential edge portion 21 of the rim material 20. A heated width (Wh) of the heated region 22 in the circumferential edge portion 21 is preferably equal to or greater than an estimated thickened length (W) of the thickened portion formed in the circumferential edge portion 21 of the rim material 20.

In addition, the heated width (Wh) means the length of the heated region 22 in the circumferential edge portion 21, and the heated region 22 mean, for example, a region at 450° C. or higher. In addition, the heating temperature of the circumferential edge portion 21 may be set to a temperature range in which the deformation resistance (strength) of the rim material 20 is sufficiently decreased to enable thickening to be easily performed and sufficient strength can be recovered after cooling. In addition, a heating method is not particularly limited and well-known methods such as induction heating or radiation heating may be employed. Among various heating methods, induction heating is particularly preferable from the viewpoint of good heating efficiency and ease of installation in an apparatus.

Details of a procedure in which the circumferential edge portion 21 (the heated region 22) in the rim material 20 receives a compressive load in the annular groove 11 and is thickened will be described with reference to FIG. 5.

Figure 5:
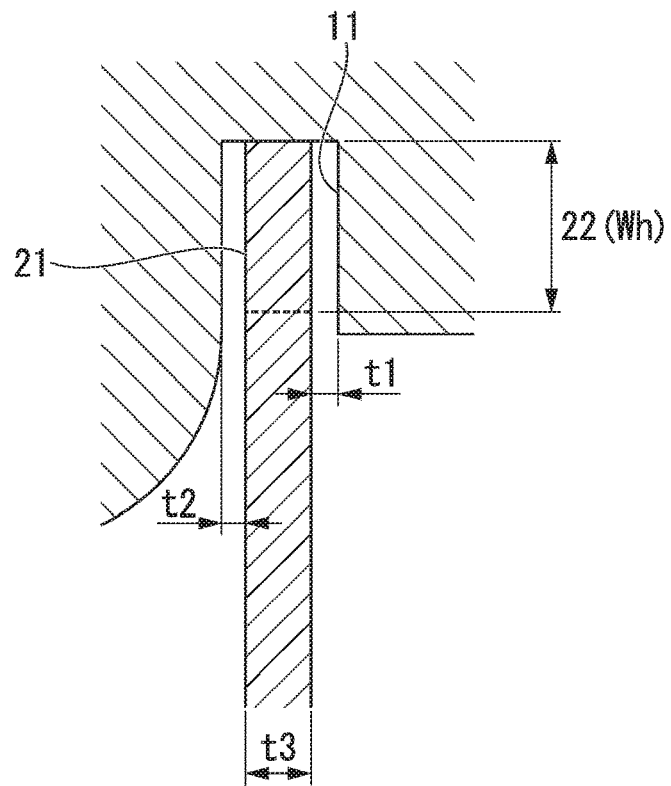
FIG. 5 is a view showing the embodiment and is a partial sectional view corresponding to the section A of FIG. 3.

In FIG. 5, the heated region 22 which is heated and reaches a temperature range, which will be described later, in the circumferential edge portion 21 is a portion indicated by the heated width Wh. In addition, in a state before a compressive load is exerted, the heated region 22 is provided with a gap t1 from the annular groove 11 on the inner circumferential surface side of the circumferential edge portion 21 and a gap t2 from the annular groove 11 on the outer circumferential surface side of the circumferential edge portion 21. In addition, in a case where the thickness of the heated region 22 is referred to as t3, the sum of t1+t2+t3 becomes substantially the same as the thickness of the circumferential edge portion 21 obtained after the thickening. In practice, by estimating that the thickness t3 will slightly decrease due to thermal contraction after cooling, the gaps t1 and t2 are preferably set to slightly greater values.

When the heated region 22 shown in FIG. 5 receives a compressive load directed toward the lower side in the figure from the annular groove 11, the length thereof gradually decreases. As compressive deformation proceeds, the thickness of the heated region 22 at each position in the vertical direction is evenly thickened and finally fills the annular groove 11. As a result, the heated region 22 is thickened into an even thickness at any position in the axial direction of the annular groove 11.

In addition, as a thickening method, both the inner circumferential surface and the outer circumferential surface of the circumferential edge portion 21 may be subjected to the thickening so as to be evenly thickened, or only one of the inner circumferential surface and the outer circumferential surface may be subjected to the thickening so as to be thickened.

In addition, an appropriate range of the heating temperature of the heated region 22 is preferably set to be equal to or higher than a temperature at which the yield stress during heating of the rim material 20 becomes half (50%) of the yield stress before the heating and to be equal to or lower than a temperature at which the yield stress after the heating and cooling becomes 90% of the yield stress before the heating. For example, the heating temperature of the heated region 22 when steel is postulated as the material used for the rim is preferably within a range of 450° C. to 850° C.

Figure 6:
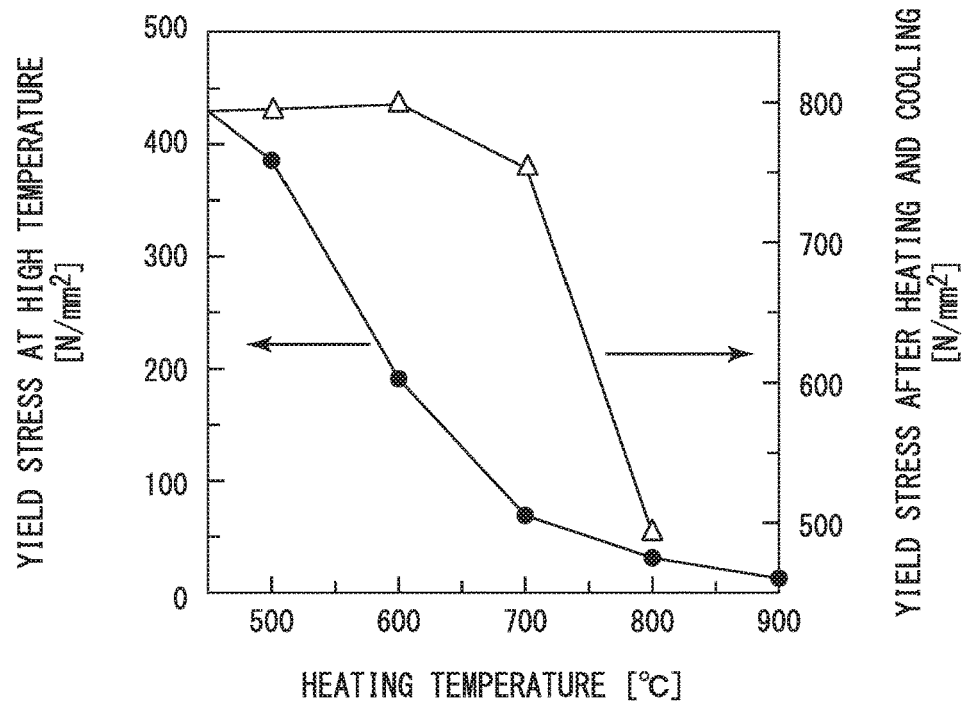
FIG. 6 is a graph showing the relationship between a heating temperature of a steel at a high temperature and after heating and cooling and yield stress which is a member strength.

FIG. 6 shows an example in which a high tensile strength steel sheet having a yield stress of 800 N/mm$^2$ is heated and the yield stress thereof is measured after the heating and cooling. As shown in FIG. 6, at a heating temperature of 450° C., the yield stress cannot be reduced to 400 N/mm$^2$ or less (half of the original yield stress or less) and thus deformation resistance is insufficiently reduced. On the other hand, when the heating temperature is 450° C. or higher, the yield stress can be reduced to 400 N/mm$^2$ or less through heating, and furthermore, the yield stress after cooling can be recovered to a value close to the original yield stress. When the heating temperature is excessively increased, the yield stress after cooling is insufficiently recovered and sufficient strength for the vehicle wheel rim cannot be ensured (for example, at 800° C., the yield stress after the cooling is reduced to 450 N/mm$^2$). Therefore, in consideration of the balance between a reduction in the yield stress through heating and the recovery of the yield stress after the cooling, the heating temperature is preferably set to 450° C. to 850° C. in a case of high tensile strength steel although the heating temperature is dependent on the material of the rim material 20. More specifically, in this temperature range, a range of 500° C. to 750° C. is more preferable.

In addition, at the point of time when the thickening step S6 is almost completed as shown in FIG. 4D, the thickened portion comes into contact with the wall surface of the annular groove 11. However, as the cooling proceeds, the thickness of the thickened portion that thermally expands slightly decreases, and the thickened portion can be easily removed from the annular groove 11.

The depth of the annular groove 11 (reference numeral D of FIG. 4A) is preferably equal to or greater than the heated width Wh of the circumferential edge portion 21 (see FIGS. 4A and 5). In a case where this is not satisfied, there may be cases where the circumferential edge portion 21 buckles and this has an adverse effect on the dimensional accuracy of an end product.

In addition, in this embodiment, at least one of the circumferential edge portions 21 of the cylindrical rim material 20 is thickened. However, particularly in a case of use as the vehicle wheel rim, the circumferential edge portion which becomes at least the outer circumferential edge portion is preferably thickened. The reason is that the outer circumferential edge portion of the vehicle wheel rim requires high strength during a collision with a curbstone. When the collision strength of this portion can be increased, the other portions can be thinned, which contributes to a reduction in the overall weight of a vehicle wheel. As a result, a vehicle provided with a plurality of vehicle wheels can be reduced, and it becomes possible to exhibit effects regarding fuel efficiency improvement and countermeasures for environmental pollution.

In addition, this embodiment can be applied to produce vehicle wheel rims with various materials and is particularly appropriate for the production of a steel wheel rim. Particularly, this embodiment is suitable for the production of a high tensile strength steel wheel rim.

As described above in detail, in the production method of the vehicle wheel rim of this embodiment, the thickening step S6 includes the heating step of heating the circumferential edge portion 21. That is, the circumferential edge portion 21 is heated and is thereafter inserted into the annular groove 11 to receive a compressive load.

In addition, in the axial direction of the rim material 20, in a case where the width of the heated region 22 of the circumferential edge portion 21 before the annular groove is exerted is referred to as Wh and the width of the thickened portion after the compressive load is exerted is referred to as W, Wh>W is satisfied.

Furthermore, in the axial direction of the rim material 20, in a case where the depth of the annular groove 11 is referred to as D and the width of the heated region 22 of the circumferential edge portion 21 before the compressive load is exerted is referred to as Wh, D>Wh is satisfied.

Furthermore, the heating temperature of the circumferential edge portion 21 is within a range of 450° C. to 850° C.

Furthermore, in the thickening step S6, the thickened portion is formed in at least the outer opening end edge, which faces the outside when mounted in a vehicle, in both the circumferential edge portions 21 of the rim material 20.

Second Embodiment

A production method of a vehicle wheel rim according to a second embodiment of the present invention will be described below. This embodiment corresponds to a modification example of the first embodiment, and differences from those of the first embodiment will be mainly described. The other configurations are considered to be the same as those of the first embodiment, and overlapping description thereof will be omitted.

In this embodiment, a temperature gradient in the vertical direction in FIG. 5 (the axial direction of the rim material 20) is applied to the heating temperature of the heated region 22.

That is, the heated region 22 is heated to have a temperature gradient such that an opening front end edge which abuts the annular groove 11 receives a compressive load first has the highest temperature and the temperature gradually decreases toward the inside from the opening front end edge. However, the temperature in the heated region 22 preferably satisfies the temperature range of 450° C. to 850° C. (more preferably 500° C. to 750° C.) described above at any point.

By applying the temperature gradient, it becomes possible to apply a deformation resistance distribution (strength distribution) in which the deformation resistance (strength) gradually decreases toward the opening front end edge from the innermost position farthest from the opening front end edge, to the circumferential edge portion 21 in the heated region 22. Since the deformation resistance distribution (strength distribution) is applied, thickening and deformation of the circumferential edge portion 21 in the thickening step S6 is locally started at the opening front end edge which has relatively low deformation resistance (strength) in the heated region 22, this local deformation gradually propagates toward the inner position, and thickening of the entirety of the heated region 22 is finally completed.

As described above, thickening and deformation of the heated region 22 during the thickening are always performed only on the processing front end edge. Therefore, it becomes possible to prevent buckling deformation of the circumferential edge portion 21 and reliably prevent the generation of wrinkles.

In each of the embodiments, the production object is the vehicle wheel rim. However, the production object of the present invention is not limited only to the vehicle wheel rim. For example, the production object can also be applied to a production method of a wheel rim for a truck or an agricultural machine.

In addition, in each of the embodiments, the material of the vehicle wheel rim is high tensile strength steel. However, the material is not limited thereto, and the vehicle wheel rim may also be produced by using a material made of an aluminum-magnesium alloy.

In addition, in each of the embodiments, in the thickening step S6, the circumferential edge portion 21 is heated before being inserted into the annular groove 11, and thereafter the thickening is performed on the circumferential edge portion 21 through compression. However, the heating and the thickening through compression may also be simultaneously performed.

That is, among the steps of FIGS. 4A to 4D described as the thickening step S6, in the stage of FIG. 4A before the circumferential edge portion 21 is inserted into the annular groove 11, heating of the circumferential edge portion 21 is not performed, and in the state of FIG. 4B in which the circumferential edge portion 21 is inserted into the annular groove 11, heating of the circumferential edge portion 21 is started. In addition, while the heating of the circumferential edge portion 21 is continuously performed as it is, the compression shown in FIGS. 4C and 4D is simultaneously performed.

In addition, as the heating method in this case, in addition to heating through induction heating, a method of heating the pressing die 10a itself and heating the circumferential edge portion 21 with the opening end edge through heat transfer caused by the contact between the pressing die 10a and the circumferential edge portion 21 may also be employed.

Figure 7:
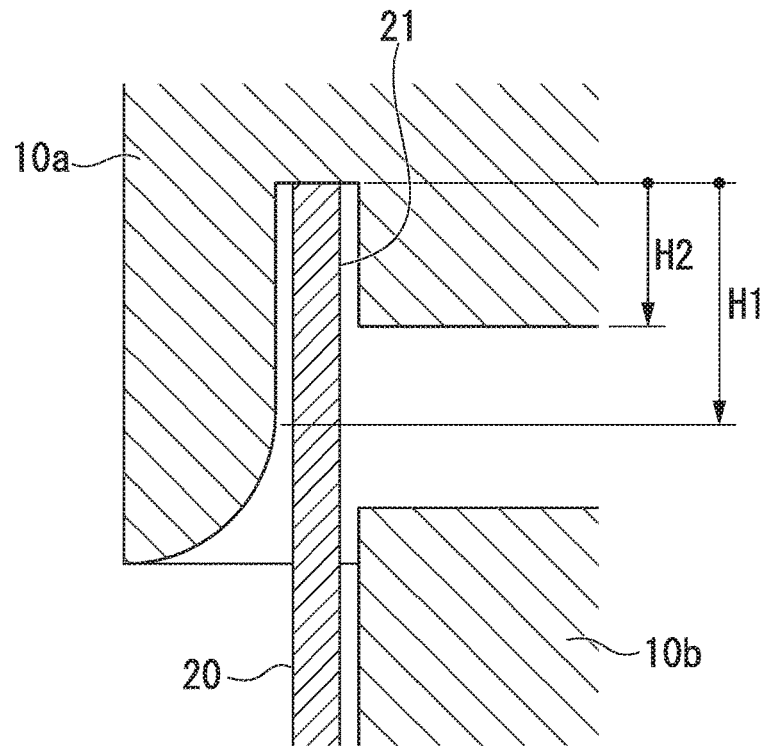
FIG. 7 is a view showing a modification example of the present invention and is a partial sectional view corresponding to FIG. 4B.

In addition, in each of the embodiments, the annular groove 11 is provided in the pressing die 10a and is formed by the annular inner wall surface and the outer wall surface having the same axis and the bottom wall surface which connects the inner wall surface and the outer wall surface, and in a case where the height from the bottom wall surface to the outer wall surface in the axial direction of the rim material 20 is referred to as H1 and the height from the bottom wall surface to the inner wall surface is referred to as H2, H1=H2 is satisfied. However, the embodiments are not limited only to this configuration, and for example, as shown in FIG. 7, the thickening may be performed using a pressing die 10a which satisfies H1>H2.

That is, in the thickening step S6, the compression may also be performed while supporting the inner circumferential surface of the circumferential edge portion 21 with the inner wall surface of the annular groove 11 during the thickening and supporting the outer circumferential surface of the circumferential edge portion 21 with the outer wall surface of the annular groove 11, which is wider than the inner wall.

In addition, in each of the embodiments, the deformation resistance is locally reduced by performing the heating step. However, means other than heating may also be employed as long as the deformation resistance can be reduced. However, among various means, it can be said that heating is the best means from the viewpoint of ease of application or the like.

Furthermore, the deformation resistance may also be locally reduced in advance by performing annealing or the like on a portion which is to become the circumferential edge portion 21 in a state a steel strip or in a state of a flat sheet cut from the steel strip.

Examples

In order to check the effects of the production method of the vehicle wheel rim of the first embodiment, the following inspection is performed in Examples.

That is, first, a plurality of flat sheets (two types of thicknesses of 2.36 mm and 2.00 mm with the same yield stress of 800 N/mm$^2$) made of high tensile strength steel were prepared, each of the flat sheet was bent into a cylindrical shape, and both end edges thereof were butt-welded, thereby obtaining two types of cylindrical rim materials (each in which the radius of the outer circumferential surface was 170 mm and the width parallel to the axial direction of the cylinder was 202 mm).

Subsequently, the circumferential edge portion of each of the cylindrical rim materials was thickened, flared, and formed into a rim shape through rolling steps.

The thickening step S6 for thickening the circumferential edge portion was performed after the circumferential edge portion was heated to 700° C. in advance, using the pressing die 10a and the supporting die 10b shown in FIGS. 4A to 4D. Two types of heated widths Wh of a case of 20 mm and a case of 28 mm were prepared. The depth of the annular groove 11 of the pressing die 10a was set to 30 mm.

In addition, for comparison, some of cylindrical rim materials in which the circumferential edge portion was not thickened were prepared, and these rim materials were flared and shaped into a rim shape through the rolling steps in the same manner.

The results of various cases described above will be described below.

Figure 8:
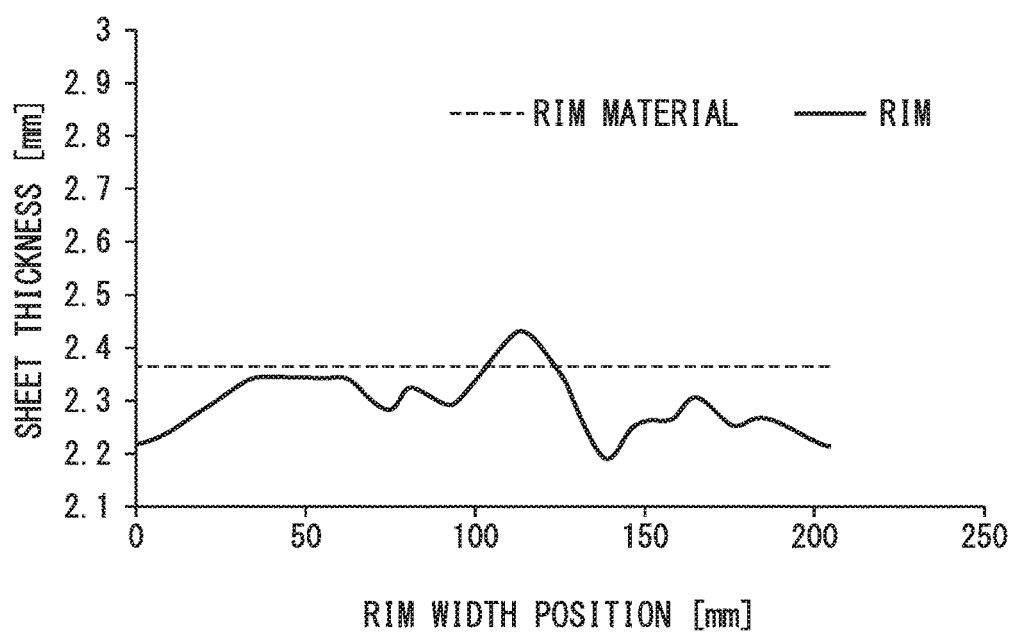
FIG. 8 is a view showing a sheet thickness distribution in a case where a 2.36 mm even thickness rim material is formed into a rim shape, in which the horizontal axis represents a position in a rim width direction and the vertical axis represents a sheet thickness.

First, in Comparative Example in which the thickening was not performed although the 2.36 mm even thickness rim material was used, as shown in FIG. 8, the circumferential edge portion of the produced rim was thinned to 2.22 mm.

Figure 9:
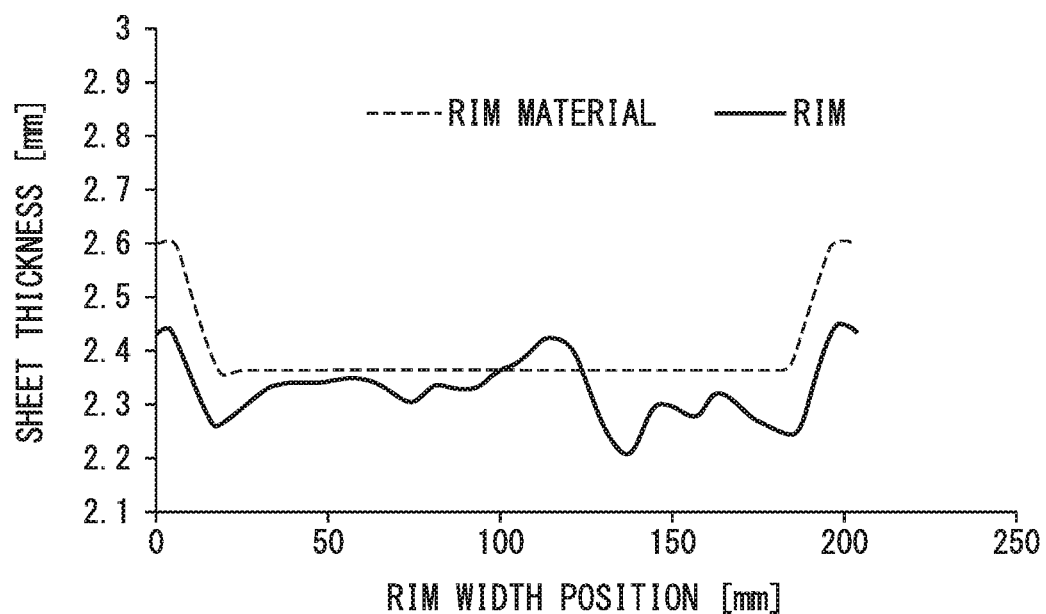
FIG. 9 is a view showing a sheet thickness distribution after forming the rim shape in a case where a rim material which has a thickness of 2.36 mm and has a circumferential edge portion thickened to 2.60 mm is used, in which the horizontal axis represents a position in a rim width direction and the vertical axis represents a sheet thickness.

On the other hand, as shown in FIG. 9, in Example in which the rim material which had a thickness of 2.36 mm and had the circumferential edge portion thickened to 2.60 mm was used, the thicknesses of regions other than the rim circumferential edge portion were the same as those of Comparative Example shown in FIG. 7 in a state after the rim material was formed into the rim shape, but the thickness of the rim circumferential edge portion could be increased to 2.43 mm.

Figure 10:
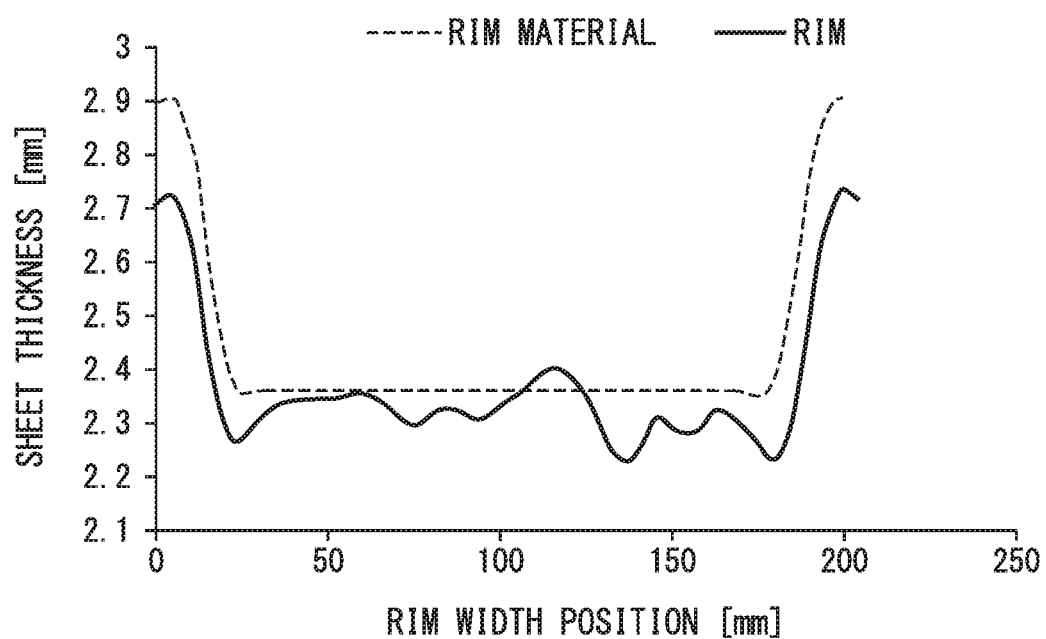
FIG. 10 is a view showing a sheet thickness distribution after forming the rim shape in a case where a rim material which has a thickness of 2.36 mm and has a circumferential edge portion thickened to 2.90 mm is used, in which the horizontal axis represents a position in a rim width direction and the vertical axis represents a sheet thickness.

In addition, as shown in FIG. 10, in Example in which the rim material which had a thickness of 2.36 mm and had the circumferential edge portion thickened to 2.90 mm was used, the thicknesses of regions other than the rim circumferential edge portion were the same as those of Comparative Example shown in FIG. 7 in a state after the rim material was formed into the rim shape, but the thickness of the rim circumferential edge portion could be increased to 2.71 mm.

Figure 11:
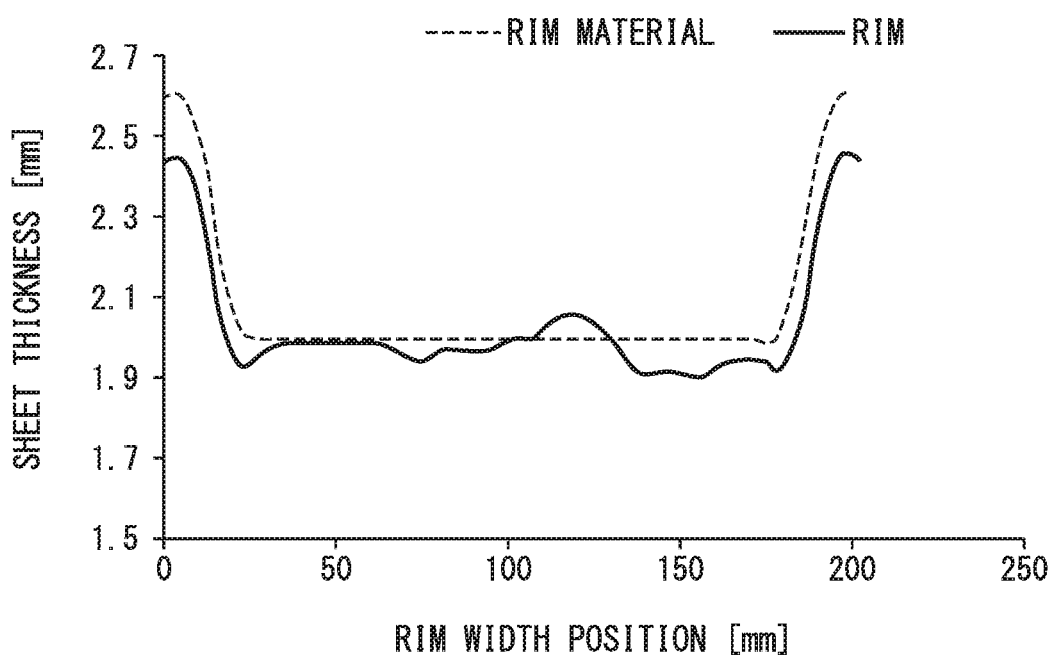
FIG. 11 is a view showing a sheet thickness distribution after forming the rim shape in a case where a rim material which has a thickness of 2.00 mm and has a circumferential edge portion thickened to 2.60 mm is used, in which the horizontal axis represents a position in a rim width direction and the vertical axis represents a sheet thickness.

Furthermore, as shown in FIG. 11, in Example in which the rim material which had a thickness of 2.00 mm and had the circumferential edge portion thickened to 2.60 mm was used, while the thicknesses of regions other than the rim circumferential edge portion were in a range of 1.91 mm to 2.06 mm, the thickness of the rim circumferential edge portion could be increased to 2.46 mm.

INDUSTRIAL APPLICABILITY

According to the present invention, a portion corresponding to the opening end edge (circumferential edge portion) of a wheel rim such as a vehicle wheel rim can be thickened with no reduction in production efficiency, and good dimensional accuracy. Therefore, even when the opening end edge (circumferential edge portion) of the rim material is thinned due to a reduction in the weight of the wheel rim, sufficient strength can be obtained by thickening the opening end edge. The present invention is particularly effective in producing a vehicle wheel rim using high tensile strength steel.

BRIEF DESCRIPTION OF THE REFERENCE SYMBOLS

1: VEHICLE WHEEL RIM (WHEEL RIM)
1a: RIM
1b: DISC
2: DROP
3a, 3b: WELL
4: LEDGE
5a, 5b: BEAD SEAT
6a, 6b: FLANGE
10: DIE
10a: PRESSING DIE
10b: SUPPORTING DIE
11: ANNULAR GROOVE
20: RIM MATERIAL
21: CIRCUMFERENTIAL EDGE PORTION, OPENING END EDGE OF RIM MATERIAL
22: HEATED REGION

The invention claimed is:

1. A production method of a wheel rim comprising:
a step of forming a cylindrical rim material into a rim shape; and
a step of increasing a sheet thickness of at least one opening end edge of the rim material at least one of before and after the step of forming of the cylindrical rim material,
wherein, the rim material is made of high tensile strength steel,
wherein, in the step of increasing of the sheet thickness, in a state in which the at least one opening end edge is inserted into an annular groove of a die provided with the annular groove which is wider than the sheet thickness of the at least one opening end edge, a thickened portion is formed by exerting a compressive load in an axial direction of the rim material on the at least one opening end edge,
wherein the step of increasing of the sheet thickness includes heating the at least one opening end edge so that a temperature in a heated region of the at least one opening end edge gradually decreases toward an inside from the at least one opening end edge in the axial direction of the rim material,
wherein the compressive load is exerted on the at least one opening end edge while the at least one opening end edge is heated in a state of being inserted into the annular groove,
wherein a heating temperature of the at least one opening end edge is within a range of 450° C. to 750° C.,
wherein, in a case where a depth of the annular groove in the axial direction is referred to as D and the width of the heated region of the at least one opening end edge before the compressive load is exerted is referred to as Wh, D>Wh is satisfied,
wherein a width of the annular groove is constant along the depth of the annular groove in the axial direction, and
wherein the annular groove is coaxial with a center of the die and the width of the groove and groove depth is the same at any position in a circumferential direction of the annular groove.

2. The production method of a wheel rim according to claim 1, wherein, in a case where a width of the heated region of the at least one opening end edge in the axial direction before the compressive load is exerted is referred to as Wh and a width of the thickened portion after the compressive load is exerted is referred to as W, Wh>W is satisfied.

3. The production method of a wheel rim according to claim 1, wherein, in the step of increasing of the sheet thickness, the compressive load is exerted while an inner circumferential surface of the at least one opening end edge is supported by an inner wall of the annular groove during the increasing of the sheet thickness and an outer circumferential surface of the at least one opening end edge is supported by an outer wall of the annular groove which is wider than the inner wall.

4. A production method of a vehicle wheel comprising:
    a step of fixing a disc into the wheel rim obtained in the production method of a wheel rim according to claim 1.

5. The production method of a vehicle wheel according to claim 4, wherein, in the step of increasing of the sheet thickness, the rim material has two opening end edges, and the thickened portion is formed in at least the opening end edge which faces the outside when mounted in a vehicle.

\* \* \* \* \*